United States Patent Office 2,927,062
Patented Mar. 1, 1960

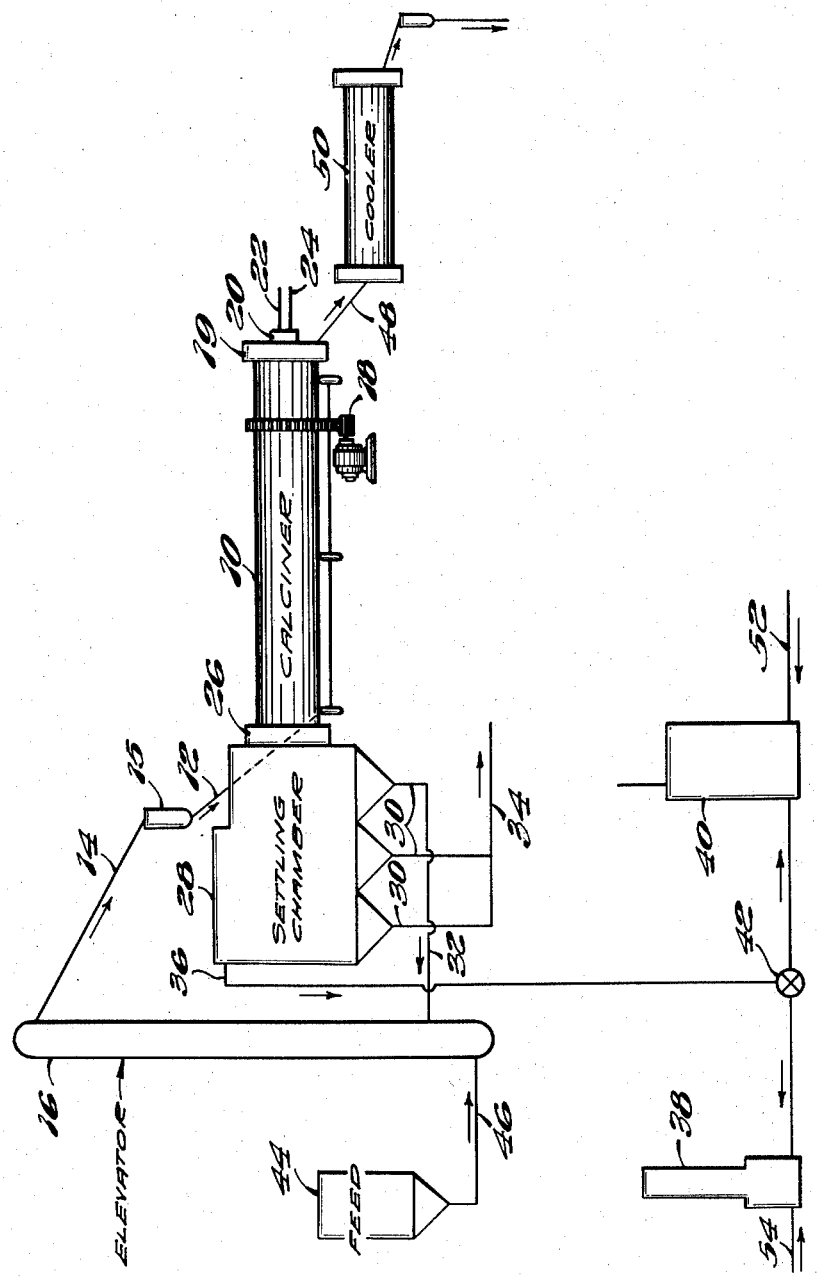

2,927,062

PROCESS AND APPARATUS FOR CALCINATION OF CARBONACEOUS MATERIALS

Harold Reintjes, Short Hills, N.J., assignor to Godfrey L. Cabot, Inc., Boston, Mass., a corporation of Massachusetts Application April 26, 1956, Serial No. 580,940

2 Claims. (Cl. 202—31)

This invention relates to processes for calcining solid carbonaceous materials and the like. More particularly it relates to a novel integrated process for effecting satisfactory calcination at desired temperatures by means of hot gases, recovering primary product solids entrained in the gases, and disposed of the gases with a minimum of difficulty. Novel apparatus for carrying out the process of this invention is included within the scope thereof.

In conventional processes for calcining materials, particularly green petroleum coke, the material is introduced into one end of a long rotary kiln mounted on a slight incline from the horizontal. The solid material is introduced into the high end of kiln and is heated by an open flame. As the kiln rotates, the solids slowly work their way toward the low end of the kiln during which time they are contacted with the hot treating gases. The solids are removed from the low end of the kiln and cooled while the hot gases are discharged from the opposite end and appropriately disposed of. Because of the inevitable air leakage around the flame a substantial amount of coke is lost by burning and excessive entrainment of small particles.

It is the principal object of this invention to provide a new calcination process which constitutes an improvement over conventional calcining processes.

It is a further object of this invention to provide such a process in which substantially all of the solid material introduced into the kiln will be treated and recovered for ultimate use.

It is also an object of this invention to provide such a process to provide useful by-product gases.

In the description of my novel process which follows, the treatment described will be that of green petroleum coke, since the process of my invention is particularly suitable for such treatment.

The objects of my invention are accomplished by constantly introducing the solid material to be treated into one end of an inclined heat-insulated rotary kiln equipped with seals at each end to make the kiln substantially airtight, at a rate appropriate to accomplish the desired extent of treatment. Hot gases, preferably generated by burning a combustible fuel in air at or just inside the opposite end of the kiln, are flowed therethrough countercurrent to the flow of the solid material. Considerable attrition of the solid material occurs as it is tumbled about in the kiln and the finer particles thus developed are entrained in the treating gases. These gases with entrained particles are discharged from the coke inlet end of the kiln and are conducted through settling chambers which are made substantially impervious to atmospheric air. The settling chambers are of sufficient size to effect substantially complete separation of the solid particles from the gases. Since the chambers are likewise airtight, the gases are not burned therein and can be conducted to suitable burning equipment such as a waste gas stack, steam generator or other similar equipment in which it may be used as auxiliary fuel. The fine solid particles separated out in the settling chamber will then be collected and recycled to the rotary kiln for calcination and treatment. The calcined coke product is discharged to a sealed cooler from which it is discharged at a temperature below its ignition temperature.

To convert green coke to a suitable state for electrode use, it must be completely carbonized by thermal treatment. As is known to those skilled in the art, most petroleum coke is not pure carbon but it is a complex carbonaceous material containing hydrocarbons, both chemically combined with the coke and absorbed thereon. The volatile matter absorbed on the coke, as well as that produced as a result of the pyrolysis of the hydrocarbon materials combined with the coke are removed by the high temperature calcining process, leaving a relatively hard dense carbon having required properties such as electrical conductivity and the like necessary for electrode manufacture.

The simplest method of producting the hot calcining gases is to burn a combustible fuel in air by means of a burner maintained in one end of the kiln. This burner is mounted in a so-called "firing hood" which is located directly in front of the kiln opening. In past practice the connection between the rotating kiln and the firing hood has been left open so that a substantial volume of air flowed continuously into the kiln, causing burning of a considerable quantity of the coke. In past practice also it has been customary to admit air to the settling chamber referred to above. This practice has, of course, resulted in burning some of the solid coke particles, which obviously forms ash, as well as in diluting the gases extensively so that they retain little subsequent utility. Thus, it is a feature of my invention to recover substantially all of these solid materials substantially ash free and provide exhaust gas which can readily be burned in appropriate equipment.

My invention will now be illustrated in connection with the accompanying drawing which is a flow diagram of the process showing apparatus components schematically.

Green coke is supplied to calciner 10 through chute 12 through seal valve 15 supplied by conduit 14 from bucket elevator 16. Calciner 10 is inclined slightly from the horizontal and may be 30 feet or more in length. It is mounted for rotation as indicated schematically by motor driven unit 18.

At the coke discharge end of the calciner there is provided a gas tight seal 19 and a burner 20 having supply lines 22 and 24 for fuel and air, respectively. The fuel may be any suitable combustible liquid or gaseous material.

At the coke inlet end calciner 10 is connected by a gas tight rotary seal 26 to settling chamber 28 having one or more solids discharge conduits 30. These conduits may be connected to recover remains in any selected combination. As here shown, one conduit is connected to recycle line 32 and the others to discharge recovery main 34. Gas flue 36 extends from the upper area of settling chamber 28 and runs to stack 38 and/or heat generating unit 40. A valve 42 is provided to divert the gas to either of the previously mentioned pieces of apparatus or to apportion the gas between them.

The process of my invention is carried out in the above described equipment as follows. Green coke from a feed tank 44 is delivered by belt or other type of conveyor 46 to the bottom of bucket elevator 16. The coke then flows through conduit 14 and pipe 12 into calciner 10. The calciner is maintained in rotation and the coke tumbles about therein slowly working its way to the low end of the calciner. Burner 20 is appropriately fired with the selected fuel and the resultant hot products of combustion are delivered to the solid product discharge end of calciner. As the coke is tumbled about it is contacted by a countercurrent flow of gases so that by the time it reaches the lower end of the calciner it is adequately treated. The treated coke is discharged through chute 48 into cooler 50, which is likewise sealed against air leakage, and is then recovered from the cooler as final product. Except for the feature of excluding air from the calciner the foregoing steps are carried out in accordance with usual practice in the industry. The flow rates and temperatures of coke and hot gases required for any extent of calcination are well-known to those skilled in the art.

The hot gases generated by burner 20 flow through the calciner and directly into settling chamber 28. The settling chamber is sufficiently larger in volume than the calciner that the velocity of gas flow decreases substantially to a rather sluggish stream. As a result of this decrease in velocity, the solid particles picked up by the gas passing over the bed of solids tend to fall to the bottom of the settling chamber from which they are conducted by appropriate valve to conduits 30. The gas now largely free of solid particles flows through pipe 36 for burning in stack 38 or heat generator 40 or both, or may be utilized for any other purpose. When utilized in the heat generator, auxiliary fuel may be required and this may be supplied through pipe 52. Likewise, when the stack is used for waste gas disposal, it must first be heated by auxiliary fuel supplied through pipe 54 in order to initiate the combustion reaction.

The advantages of this process over conventional rotary calcination processes are numerous. By sealing both ends of the kiln against air leakage product loss from combustion is reduced by 10–15%. With air excluded settling chamber 28 can be constructed of less expensive refractory which in turn is not subject to deterioration from high temperature attack as has heretofore been the case. Additionally, the gas eventually recovered from the system has good burning characteristics whereas that resulting from conventional processes and apparatus is very poor in this regard.

It will thus be seen that I have provided a novel process and apparatus for efficiently and effectively carrying out the calcination of carbonaceous materials generally and green petroleum coke specifically. It is believed that this novel process effects a substantial improvement over processes presently being practiced commercially.

Having thus described my invention, I claim:

1. In a process for treating green coke to effect substantially complete carbonization thereof wihout appreciable formation of ash therefrom and separation of volatiles therefrom in which said material is slowly passed through a rotating unobstructed calcination zone and is heated by hot combustion product gases produced by burning a separately introduced combustible fuel mixture at one end of said zone, the improvement which comprises completing calcination of the carbonaceous material in the calcination zone, conducting the solid carbonized product from one end thereof and cooling same, conducting the gases with entrained fine solid particles from the other end of said zone and separating the fine particles from the gases, all in the absence of appreciable free oxygen.

2. The process according to claim 1 in which the green coke is petroleum coke.

References Cited in the file of this patent

UNITED STATES PATENTS

| | | |
|---|---|---|
| 1,717,786 | Clayton-Kennedy | June 18, 1929 |
| 2,151,849 | Hardy | Mar. 28, 1939 |
| 2,664,389 | Rex et al. | Dec. 29, 1953 |
| 2,755,234 | Reintjes | July 17, 1956 |
| 2,785,115 | Borch | Mar. 12, 1957 |
| 2,843,533 | Smith | July 15, 1958 |